Nov. 8, 1960     R. W. GOODE     2,959,253
DISK BRAKE
Filed July 20, 1956     3 Sheets-Sheet 1
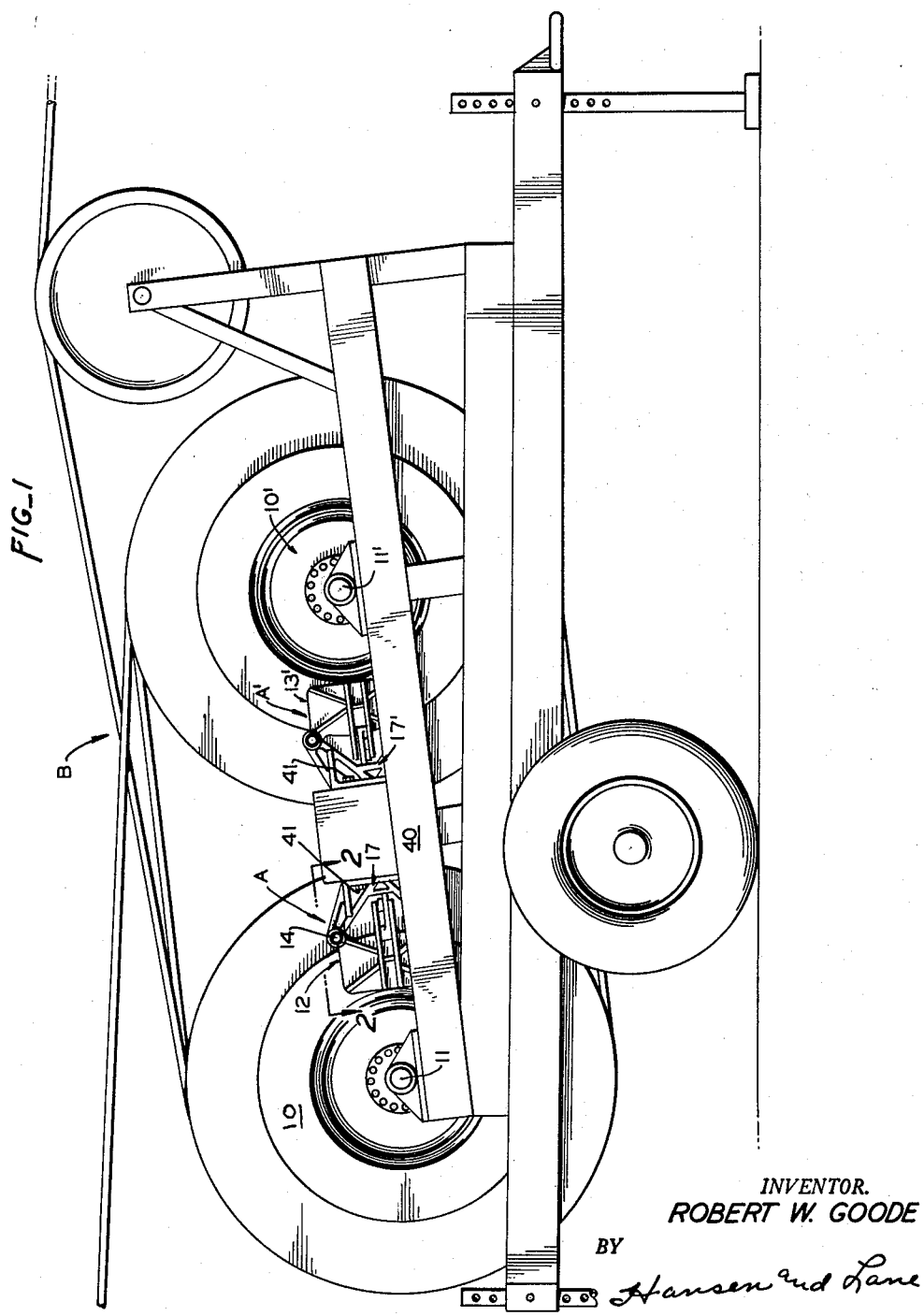
INVENTOR.
ROBERT W. GOODE
BY
Hansen and Lane
ATTORNEYS Nov. 8, 1960
R. W. GOODE
2,959,253
DISK BRAKE
Filed July 20, 1956
3 Sheets-Sheet 2
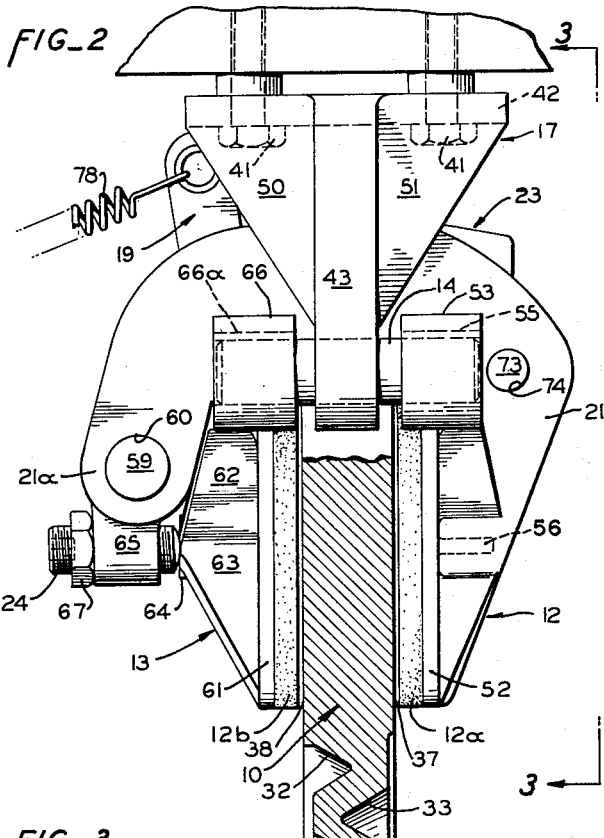
INVENTOR.
ROBERT W. GOODE
BY
Hansen and Lane
ATTORNEYS

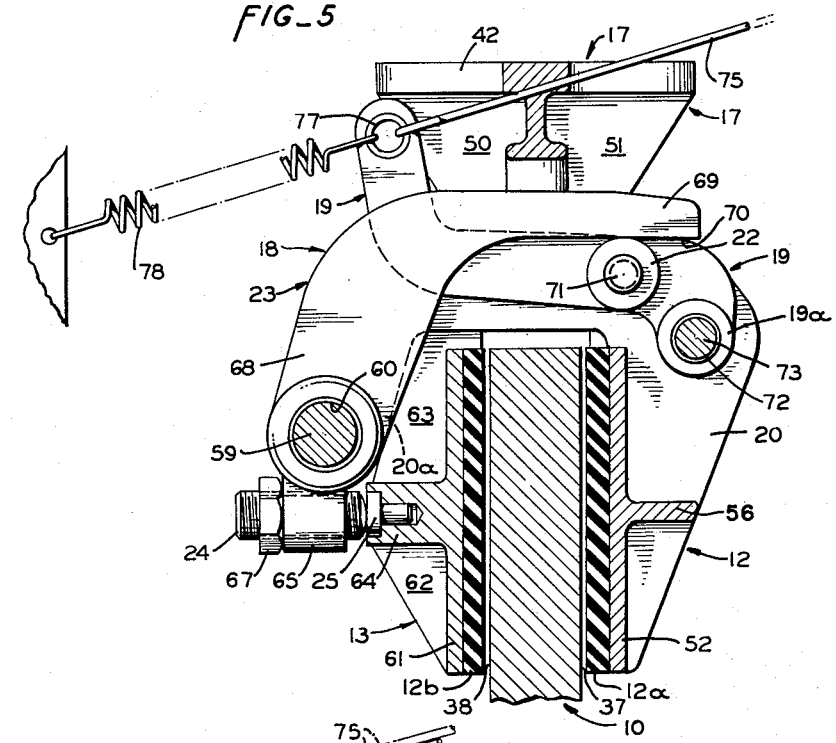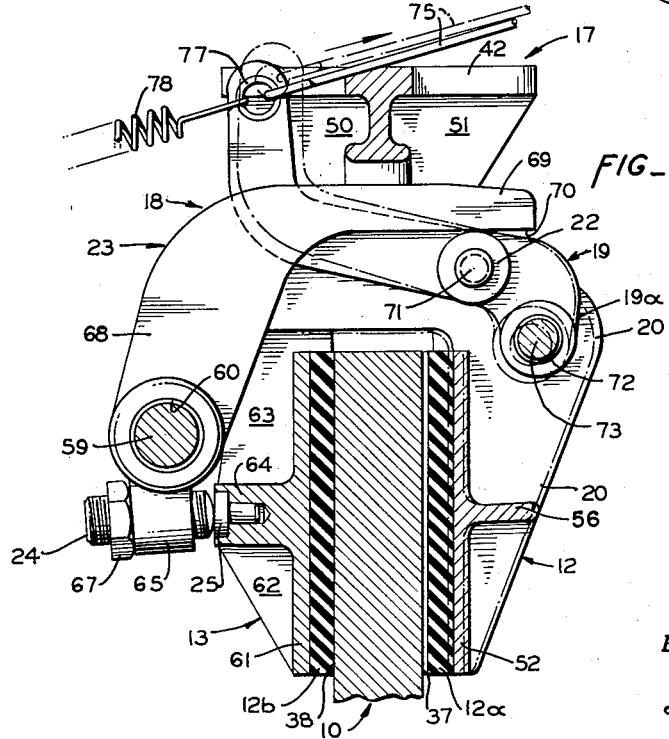

United States Patent Office 2,959,253
Patented Nov. 8, 1960

2,959,253

DISK BRAKE

Robert W. Goode, Morgan Hill, Calif., assignor to Gerald A. M. Petersen, Santa Clara, Calif.

Filed July 20, 1956, Ser. No. 599,071

7 Claims. (Cl. 188—73)

The present invention relates to a brake, and pertains more particularly to a disk type brake wherein a pair of brake shoes engage opposite faces of a disk in parallel, pressure-equalized relation.

In recent years a considerable amount of development work has been done on disk type brakes, and such brakes have been used on many applications wherein the older drum type brakes are apt to overheat and fade, with sometimes costly and dangerous results.

While disk type brakes have many recognized advantages over the more widely used drum type brakes, some of the former developed to date have been difficult to balance and to maintain in full braking engagement with the disk. Also, during a severe braking operation, the disk may warp under the heat developed, and in some cases the shoes may be thrown out of alignment, causing them to seize with possibly dangerous results.

The present invention contemplates the provision of an improved disk-type brake.

The invention also provides a disk-type brake wherein two brake shoes are applied to opposite faces of a disk, and are maintained in parallel relation to each other and to the disk, and wherein the pressures applied by the shoes on opposite faces of the disk tend to be equalized by the brake mechanism.

The invention also provides a brake disk which is so constructed in the zone radially inwardly of the braking surface thereon as to facilitate the dissipation of heat generated by the braking action, and to reduce the transfer of heat radially inwardly toward the hub.

A further object of the brake disk structure is to reduce warping of the disk under severe and prolonged braking.

These and other objects and advantages of the invention will be apparent from the following description and the accompanying drawings, consisting of three sheets, wherein Fig. 1 is a side elevational view of a cable tensioning mechanism having disk type brake mechanism embodying the present invention mounted thereon.

Fig. 2 is an enlarged, fragmentary, sectional view taken along line 2—2 of Fig. 1.

Fig. 3 is a similarly enlarged fragmentary elevational view looking in the direction of the arrows 3—3 in Fig. 2.

Fig. 4 is a sectional view in reduced scale taken diametrically through the brake disk.

Fig. 5 is a fragmentary sectional view to the same scale as Figs. 2 and 3 taken along line 5—5 of Fig. 3, showing the parts in their normal, released condition.

Fig. 6 is a view similar to Fig. 5 showing the parts in an initial position of engagement with the disk in solid lines, and in braking engagement with the disk in broken lines.

Briefly, the invention comprises a brake A comprising a disk 10 fixedly secured to a shaft 11, rotation of which is to be controlled by the brake. A pair of brake shoes 12 and 13 are mounted for guided, slidable movement on the opposite ends of a pair of shoe support rods 14 and 15, which are secured medially of their lengths to a shoe supporting frame 17 and provide a guide track for the shoes. The brake shoes 12 and 13 are positioned on the opposite sides of the disk 10, so as to grip the latter therebetween upon actuation of the brake.

Linkage 18 operatively interconnects the brake shoes 12 and 13, and includes a lanyard-actuated, spring-returned, main actuating lever 19. The lever 19 is pivotally mounted between the base portions of a pair of arched arms 20 and 21 fixedly mounted on the main brake shoe 12, and a roller 22, mounted on a side of the lever 19, is in rolling engagement with a secondary brake actuating lever 23. The secondary actuating lever 23 is pivotally mounted between the outer or terminal ends of the arched, main brake shoe arms 20 and 21, and an adjustable pressure transmitting screw 24 is threadedly inserted in the short lower end portion of the secondary actuating lever 23 for pressing engagement with a hard-faced insert 25 in the secondary brake shoe 13.

Referring to the details of the illustrated embodiment A of the invention, the brake disk 10 is of suitable metal, such as steel, with a center hole 27 (Fig. 4) therein of a size to fit onto the shaft 11 (Fig. 1) rotation of which is to be controlled by the brake. A plurality of openings 28 are provided around the central shaft opening 27 to receive bolts 29 (Figs. 1 and 4) which secure the disk 10 to a hub flange 30. The hub flange in turn is fixedly secured to the shaft 11 as by means of a conventional key (not shown) mounted in a keyway 31.

A plurality of circular grooves 32, 33, 34 and 35, of progressively reduced diameter, concentric with the disk 10 and with each other, are provided alternately on opposite sides of the disk 10 inwardly of its braking surfaces 37 and 38. These circular grooves preferably are of similar, rounded, V cross sectional shape, and also preferably are of gradually increasing depth from the radially outermost one 32 to the innermost one 35. This produces a corrugating and gradual thinning of the metal throughout the grooved or corrugated zone 39 of the disk as is clearly apparent in Fig. 4. This gradual thinning and corrugating of the metal throughout the zone 39 has a three-fold effect, as follows: (1) It increases the exposed surface area throughout the zone 39 over that which would be exposed if this zone were not grooved and thus assists in dissipation of the heat generated by a braking operation. (2) By gradually reducing the thickness of the metal from the outer to the inner limits of this zone it resists and controls the conduction of such heat from the marginal braking zone into the hub portion. (3) By permitting expansion of the metal in the corrugated zone 39 it reduces the probability of warping in the disk.

Two complete brakes A and A' are shown in the cable tensioner B of Fig. 1, one A to control the disk 10 secured to the rear bull wheel shaft 11 and the other A' to control the disk 10' secured to the forward bull wheel shaft 11'. Since the two brake mechanisms are substantially identical, the rear one A only will be described in detail herein.

The shoe support frame 17, which may be of steel, is fixedly secured by bolts 41 to the support element 40, which may be a bull wheel bed stringer of the cable tensioner B.

The frame 17 comprises a flat base portion 42, and a pair of similar, outwardly divergent rod support arms 43 and 44. The support arms 43 and 44 are provided with lightening holes 47 and 48 in each thereof, and a transverse bracing member 49 formed integrally therewith, connects these arms adjacent their base. A pair of integral, triangular bracing webs 50 and 51 extends from each of the arms 43 and 44 to the base portion 42.

The brake shoe support rods 14 and 15 are secured in longitudinally centered position in the outer ends of the rod support arms 43 and 44, respectively. The rods 14 and 15 are axially parallel to each other and are mounted parallel to the axis of rotation of the brake disk 10 associated therewith.

The main and secondary brake shoes 12 and 13 may be of suitable metal, such as steel, with linings 12a and 12b of suitable brake block material, bonded to their respective shoes. Since such lining material and the manner of bonding it to the shoes are well known, and since the details thereof form no part of the present invention, they are not described further herein.

The main brake shoe 12 comprises a flat plate portion 52 provided with mounting ears 53 and 54 (Fig. 3) on the upper, outer corners thereof. Bushings 55, which may be of bearing grade bronze, are fitted into the bores of these ears, and have sliding, co-axial, bearing support on the rods 14 and 15. This mounting arrangement firmly supports the plate portion 52 in a plane normal to the axes of the rods 14 and 15. The fit between the bushings 55 and the rods 14 and 15 should be such as to hold the shoe firmly against tilting displacement, but still free for easy sliding movement along the rods.

A pair of integral reinforcing ribs 57 and 58 extend diagonally across each half of the outer side of the main brake shoe 12, and are integrally connected at their inner ends to one of the pair of laterally spaced, arched arms 20 and 21, which also are integral with the plate portion 52 of the main brake shoe 12.

The arms 20 and 21 are braced by an integral rib 56 extending transversely therebetween. The arms 20 and 21 are flat and parallel to each other, as best illustrated in Fig. 3, and the brake operating linkage 18, to be described in detail later herein, is mounted therebetween.

The arms 20 and 21 on the main brake shoe are arched across, and are radially clear of the brake disk 10. Their terminal portions 20a and 21a, respectively, extend radially inwardly of the disk to overlie the opposite side of the secondary brake shoe 13. A pivot pin 59 is fitted into axially aligned holes 60 (Fig. 2) provided one in the terminal end of each of the arms 20 and 21 to extend therebetween, and the secondary actuating lever 23 is pivotally mounted on the pin 59 between the arms 20 and 21.

The secondary brake shoe 13 (Figs. 2, 5 and 6) is basically similar to the main brake shoe 12, and comprises a flat plate portion 61 which is similar in outline and general structure to the plate portion 52 of the main shoe 12. Mounting ears 66 are provided on the upper, outer corners of the plate portion 61 and bushings 66a are fitted into these ears for guided, sliding support on the opposite ends of the rods 14 and 15 from the main brake shoe 12.

A central boss 64 is provided between the inner ends of diagonal bracing ribs 62 and 63 which are provided on each side of the outer face of the plate portion 61, and the hardened insert 25 (Figs. 5 and 6) is flush-mounted in a hole provided therefor axially of the boss 64 to receive the thrust of the pressure transmitting screw 24 which is threadedly inserted in a threaded hole provided therefor transversely of the short, projecting, lower end portion 65 of the secondary brake actuating lever 23. A lock nut 67 on the screw 24 holds it in adjusted position.

On the opposite side of the pivot pin 59 from the short lever arm portion 65, the secondary brake actuating lever 23 extends radially, outwardly at 68 to a point beyond the disk 10, and has a straight portion 69 extending transversely across the plane of the disk well beyond the disk periphery.

The inner edge 70 of this transversely extending lever portion 69 is flat, and has rolling support on the roller 22, which is journaled on a stud 71 on a side of the main brake actuating lever 19. The latter is of irregular S shape, and its lower end portion 19a is fitted between the base portions of the arched, main shoe arms 20 and 21. A bearing bushing 72 (Figs. 5 and 6) is fitted into a hole provided therefor in the lower end of the main actuating lever 19, and provides journal mounting for a pin 73 mounted in axially aligned holes 74 (Fig. 2) provided therefor in the arms 20 and 21.

A lanyard 75 (Figs. 5 and 6) is connected to an eye portion 77 provided on the outer end of the main actuating lever 19 for pulling this outer end portion of the lever in the direction of the arrow in Fig. 5 to actuate the brake.

A retracting spring 78 is mounted between the lever eye portion 77 and a stationary frame member 79 (Fig. 5) normally to urge the brake shoes 12 and 13 apart to their unactuated condition shown in Figs. 2 and 5, in which condition the brake linings 12a and 13a are free from pressure engagement with the braking surfaces 37 and 38 of the disk 10. Although desirable, the spring 78 is not actually necessary, since the weight of the lever 19 will tend to return this lever to its normal, releasing condition.

In actuating the brake A by means of the lanyard 75, the parts progress from their positions of Figs. 2 and 5, through their solid line positions of Fig. 6, and thence to their broken line positions of Fig. 6 as follows:

As the eye portion 77 of the main actuating lever 19 is drawn toward the right from its normal position of Figs. 2 and 5, it swings the lever 19 clockwise about its mounting pivot 73. This forces the roller 22 outwardly against the flat inner face 70 of the transversely extending portion 69 of the secondary actuating lever 23, thereby swinging the latter in a counter-clockwise direction about its mounting pivot 59. Since the pivot pin 59 is mounted in the holes 60 in the terminal ends of the arched main shoe arms 20 and 21, the short lower extension 65 of the lever 23 moves the pressure transmitting screw 24 mounted therein inwardly into pressing engagement with the hardened insert 25 fitted into the boss 64 of the secondary brake shoe 13. This action forces the secondary shoe 13 inwardly, sliding it in accurately guided relation along its support rods 14 and 15, thereby bringing its brake lining 13a into engagement with the braking surface 38 of the disk 10, which arrests further movement of the secondary shoe as shown in solid lines in Fig. 6.

Further outward movement of the eye portion 77 of the main actuating lever 19 after the secondary brake shoe 13 has thus been arrested by its engagement with the disk 10 produces a lever action by the secondary actuating lever 23 with the point of engagement between the pressure transmitting screw 24 and the insert 25 as the point of application, and the axis of the pivot pin 59 as the fulcrum. Since the pivot pin 59 is mounted in the terminal ends of the main brake shoe arms 20 and 21, and since these arms are fixedly secured to the main shoe 12, this lever action urges the main brake shoe 12 slidably, in guided condition, along the support rods 14 and 15 to its broken line position of Fig. 6, thereby bringing its lining 12a into engagement with the opposite braking surface 37 of the disk 10. Up to this point no appreciable braking force has been exerted.

Further outward force applied to the eye portion 77 of the main actuating lever 19 forces the brake shoes 12 and 13 toward each other into powerful, gripping, braking engagement with the braking surfaces 37 and 38 of the disk 10. Since both shoes are free for slidable, guided movement along their common support rods 14 and 15, it is obvious that the entire brake shoe assembly including the shoes 12 and 13 and their interconnecting linkage 18 is free at all times to float to pressure equalized condition relative to the disk 10. A smooth, powerful braking action is thus provided, with no danger of relative tilting of the braking surfaces which might cause fading or seizing.

Upon release of the lanyard 75, the spring 78 returns the main actuating lever 19 to its normal, brake releasing position shown in Figs. 2 and 5. The spring preferably is of a length to be fully retracted when the main actuating lever 19 is in its normal position of Figs. 2 and 5, so that no appreciable force will be exerted on the actuating lever which might tend to draw the brake shoe assembly toward the left from its position of Figs. 2 and 5 and thus cause the main brake shoe 12 to ride against the disk when the brake is released.

Adjustment of the brake is accomplished by loosening the lock nut 67 and screwing the pressure transmitting screw 24 in or out as required. Screwing this screw inwardly toward the pressure insert 25 moves the brake shoes 12 and 13 relatively toward each other, and thus reduces their clearance from the disk 10, while screwing the screw outwardly increases this clearance. After adjustment, the screw is locked in adjusted position by again tightening the lock nut.

The invention provides an extremely rugged and simple brake mechanism, capable of exerting tremendous braking stresses for extended periods without danger of fading or over-heating, and one which is inexpensive to maintain and capable of easy and accurate adjustment. Due to the free floating arrangement of the shoe assembly, balance of pressure exerted by the shoes on the disk is assured.

The device is illustrated as being mounted on a cable tensioning mechanism, but it is obvious that the invention is capable of numerous other applications.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A disk type brake comprising a disk secured coaxially to a rotary element, the rotation of which is to be controlled by the brake, a shoe support frame fixedly mounted adjacent the disk, a guide track on said frame extending in a direction and normal to the plane of said disk, a pair of brake shoes slidably mounted for guided support on the guide track of said support frame, the shoes being mounted on opposite sides of the disk for movement toward and from the same, linkage operatively interconnecting the shoes, said linkage comprising a main actuating lever pivotally mounted on one of the shoes, a roller mounted on the main actuating lever at a point between its pivotal axis and an end remote from said axis, a second lever pivotally mounted on said one shoe at a point remote from the pivotal mounting of the main actuating lever thereon, a portion of said second lever being supported on said roller, and a second portion of said second lever overlying the other shoe for forcing the shoes toward each other and into equalized, gripping, braking relation with the disk upon a predetermined movement of the main actuating lever.

2. A disk type brake comprising a disk secured coaxially to a rotary element, the rotation of which is to be controlled by the brake, a shoe support frame fixedly mounted adjacent the disk, a guide track on said frame extending transversely of said disk, a pair of brake shoes slidably mounted for guided support on the guide track for movement in a direction normal to the plane of the disk, the shoes being mounted on opposite sides of the disk, and linkage operatively interconnecting the shoes, said linkage comprising a main actuating lever pivotally mounted on one of the shoes, and a second lever pivotally mounted on said one shoe at a point remote from the pivotal mounting of the main actuating lever thereon, said secondary lever having one long arm in supported, operative engagement with a portion of the main lever between its axis of pivotal mounting and an end remote from said axis, said secondary lever having a short, oppositely extending portion overlying the other shoe for forcing the shoes toward each other and into equalized gripping, braking relation with the disk upon a predetermined movement of the main actuating lever.

3. A disk type brake comprising a disk secured coaxially to a rotary element, the rotation of which is to be controlled by the brake, a shoe support frame fixedly mounted adjacent the disk, a guide track on said frame and extending transversely of said disk, a pair of brake shoes slidably mounted for guided support on the guide track for movement in a direction normal to the plane of the disk, the shoes being mounted on opposite sides of the disk, and linkage operatively interconnecting the shoes, said linkage comprising a main actuating lever pivotally mounted on one of the shoes, a second lever pivotally mounted on said one shoe at a point remote from the pivotal mounting of the main actuating lever thereon, said secondary lever having one long arm in supported, operative engagement with a portion of the main lever between its axis of pivotal mounting and an end remote from said axis, said secondary lever having a short, oppositely extending portion overlying the other shoe, and a pressure screw threadedly mounted in said short portion of the secondary lever, an end of said screw being exposed for bearing on a central portion of said other shoe for forcing the shoes toward each other and into equalized gripping, braking relation with the disk upon a predetermined movement of the main actuating lever.

4. A disk type brake including a brake disk mounted coaxially on a rotary element to be controlled by the brake and having a braking area on each side thereof, a brake shoe support frame mounted radially beyond the disk and spaced therefrom, a guide track on said frame extending transversely of the plane of the disk, a pair of brake shoes mounted for slidable, guided movement along the track, one of the shoes being mounted on each side of the disk and opposite a braking area thereof, an arched arm fixedly secured to one of said shoes and extending in arched relation over and radially beyond the periphery of the disk and overlying the outer side of the other shoe, a main actuating lever pivotally mounted on said one shoe adjacent the zone of attachment of said arched arm to said one shoe, a secondary actuating lever pivotally mounted on a terminal portion of the arched arm and having a portion thereof overlying the outer face of the other shoe, and means operatively interconnecting the levers for pivotal movement of the secondary lever upon a pivotal movement of the main lever, whereby, upon a predetermined pivotal movement of the main actuating lever the portion of the secondary actuating lever overlying said other shoe is swung into pressing engagement with said other shoe, thereby initially urging the latter into engagement with the disk and thereafter, upon continued movement of the main actuating arm in said predetermined direction, urging both shoes forcibly toward each other and into gripping, braking engagement with the disk.

5. A disk type brake including a brake disk mounted coaxially on a rotary element to be controlled by the brake and having a braking area on each side thereof, a brake shoe support frame mounted radially beyond the disk and spaced therefrom, a guide track on said frame extending transversely of the plane of the disk, a pair of brake shoes mounted for slidable, guided movement along the track, one of the shoes being mounted on each side of the disk and opposite a braking area thereof, an arm fixedly secured to one of said shoes and having a portion thereof overlying the outer side of the other shoe, a main actuating lever pivotally mounted on the arm adjacent its base, a roller mounted on the main actuating lever in outwardly spaced relation to the pivotal axis of the main actuating lever, a secondary actuating lever pivotally mounted on the portion of said arm overlying the other shoe, a pressure member mounted in the secondary lever for pressure engagement with the other shoe, a portion of the secondary lever extending transversely of the plane of the disk and riding on the outer side of said roller, whereby, upon a pivotal movement of the main actuating lever moving the roller outwardly the secondary actuating lever is swung to move said pressure member into pressing engagement with said other shoe, thereby urging the latter into engagement with the disk and thereafter, upon continued movement of the main actuating lever in the same direction, urging both shoes forcibly toward each other and into gripping, braking engagement with the disk.

6. A disk type brake including a brake disk mounted coaxially on a rotary element to be controlled by the brake, a brake shoe support frame mounted radially beyond the disk and spaced therefrom, a guide track on said frame extending transversely of the plane of the disk, a pair of brake shoes mounted for slidable, guided movement along the track, one of the shoes being mounted on each side of the disk and opposite a braking area thereof, an arm fixedly secured to one of said shoes and having a portion thereof extending transversely across the disk and laterally beyond the other shoe, a main actuating lever pivotally supported on said one shoe adjacent the base of said arm, a secondary actuating lever pivotally mounted on the terminal end of the arched arm and having a portion thereof extending in one direction from its pivotal axis and overlying the outer face of the other shoe, an oppositely extending portion of said secondary lever being supported on an element of the main actuating lever, whereby, upon a predetermined pivotal movement of the main actuating lever, the secondary actuating lever is swung to move its portion overlying said other shoe into pressing engagement with said other shoe, thereby urging the latter into engagement with the disk, and thereafter upon a continuation of said predetermined movement of the main lever, urging both shoes forcibly toward each other and into gripping, braking engagement with the disk.

7. A disk type brake comprising a disk secured coaxially to a rotary element, the rotation of which is to be controlled by the brake, a shoe support frame fixedly mounted adjacent the disk, a pair of guide tracks mounted on said shoe support frame parallel to the axis of said disk, a pair of brake shoes slidably mounted for guided support on said guide tracks on opposite sides of the disk for movement in a direction normal to the plane of the disk, and linkage operatively interconnecting the shoes comprising an arched arm on one of said shoes having a terminal portion overlying the outer side of the other one of said shoes, a main actuating lever pivotally mounted on said one of the shoes, and a second lever pivotally mounted on the terminal end of said arched arm at a point remote from the pivotal mounting of the main actuating lever on said one shoe, said secondary lever having operative engagement with the main lever and pressure engagement with the outer side of the other shoe for forcing the shoes toward each other and into equalized, gripping, braking relation with the disk.

References Cited in the file of this patent
UNITED STATES PATENTS

| | | |
|---|---|---|
| 1,457,445 | Marcum | June 5, 1923 |
| 1,959,049 | Buus | May 15, 1934 |
| 2,365,369 | Williams | Dec. 19, 1944 |
| 2,375,152 | Turner | May 1, 1945 |
| 2,375,566 | Lipps | May 8, 1945 |
| 2,380,085 | Tack et al. | July 10, 1945 |
| 2,457,400 | Roos | Dec. 28, 1948 |
| 2,781,106 | Lucien | Feb. 12, 1957 |
| 2,781,223 | Fluto | Feb. 12, 1957 |
| 2,827,985 | Butler | Mar. 25, 1958 |

FOREIGN PATENTS

| | | |
|---|---|---|
| 701,948 | Great Britain | June 6, 1954 |
| 729,859 | Great Britain | May 11, 1955 |